United States Patent [19]

Thomas

[11] Patent Number: 5,004,293
[45] Date of Patent: Apr. 2, 1991

[54] CARGO TRUCK BODY

[75] Inventor: John F. Thomas, Goshen, Ind.

[73] Assignee: Cargo Master Incorporated, Goshen, Ind.

[21] Appl. No.: 496,763

[22] Filed: Mar. 21, 1990

[51] Int. Cl.$^5$ .............................................. P60P 3/32
[52] U.S. Cl. ...................................... 296/166; 296/190
[58] Field of Search ...................... 296/183, 166, 190; 105/17, 18

[56] References Cited
U.S. PATENT DOCUMENTS 4,157,201 6/1979 Collins et al. ...................... 296/166
4,378,856 4/1983 Miller ................................... 296/166

FOREIGN PATENT DOCUMENTS 11932 1/1984 Japan .

Primary Examiner—Robert R. Song
Attorney, Agent, or Firm—Thomas J. Dodd

[57] ABSTRACT

A cargo truck which includes a cab and a body portion connected to a frame chassis. The cab and body are interconnected for travel therebetween by a passageway which is sealed by a connecting boot to prevent ingress of moisture and to reduce vibrational forces on the body during road travel.

4 Claims, 3 Drawing Sheets

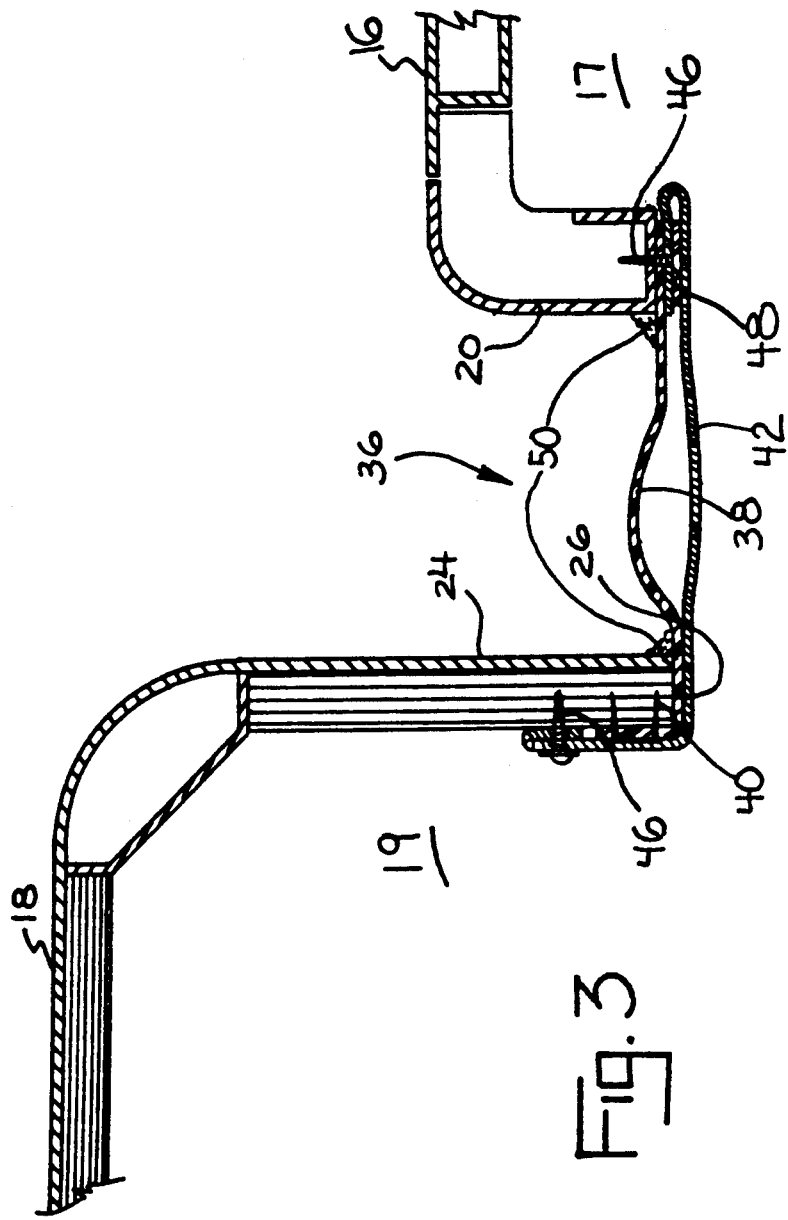

CARGO TRUCK BODY

SUMMARY OF THE INVENTION

This invention relates to cargo trucks and will have special application to a flexible connector positioned between the cab rear wall and body front wall.

Currently, walk-through cargo trucks have the body front wall attached directly to the rear wall of the cab. This construction allows vibrational forces from road travel to be transmitted to the truck body, particularly in larger trucks which systematically weakens the connecting fasteners and body. After relatively short time periods, the body deteriorates and must be repaired or replaced, usually at a high cost to the truck manufacturer under a conventional warranty.

The walk-through cargo truck of this invention includes a cab and a body which are separated and have aligned holes to allow travel between the cab and body. A flexible boot is secured to the cab back wall and body front wall and spans the gap therebetween. During road travel, vibrational forces generated by cab movement are absorbed by the boot and are not borne by the truck body. The boot may include a sealant to prevent ingress of moisture into the cab or body interior compartments.

Accordingly, it is an object of this invention to provide for a novel walk-through cargo truck.

Another object is to provide a walk-through cargo truck which reduces vibrational forces on the truck body during road travel.

Another object is to provide a walk-through cargo truck boot which effectively seals the cab and body compartments against ingress of moisture.

Other objects will become apparent upon a reading of the following description.

BRIEF DESCRIPTION OF THE DRAWINGS

FIG. 3 is a fragmented sectional view taken along line 3—3 of FIG. 2.

DESCRIPTION OF THE PREFERRED EMBODIMENTS

Figure 1:
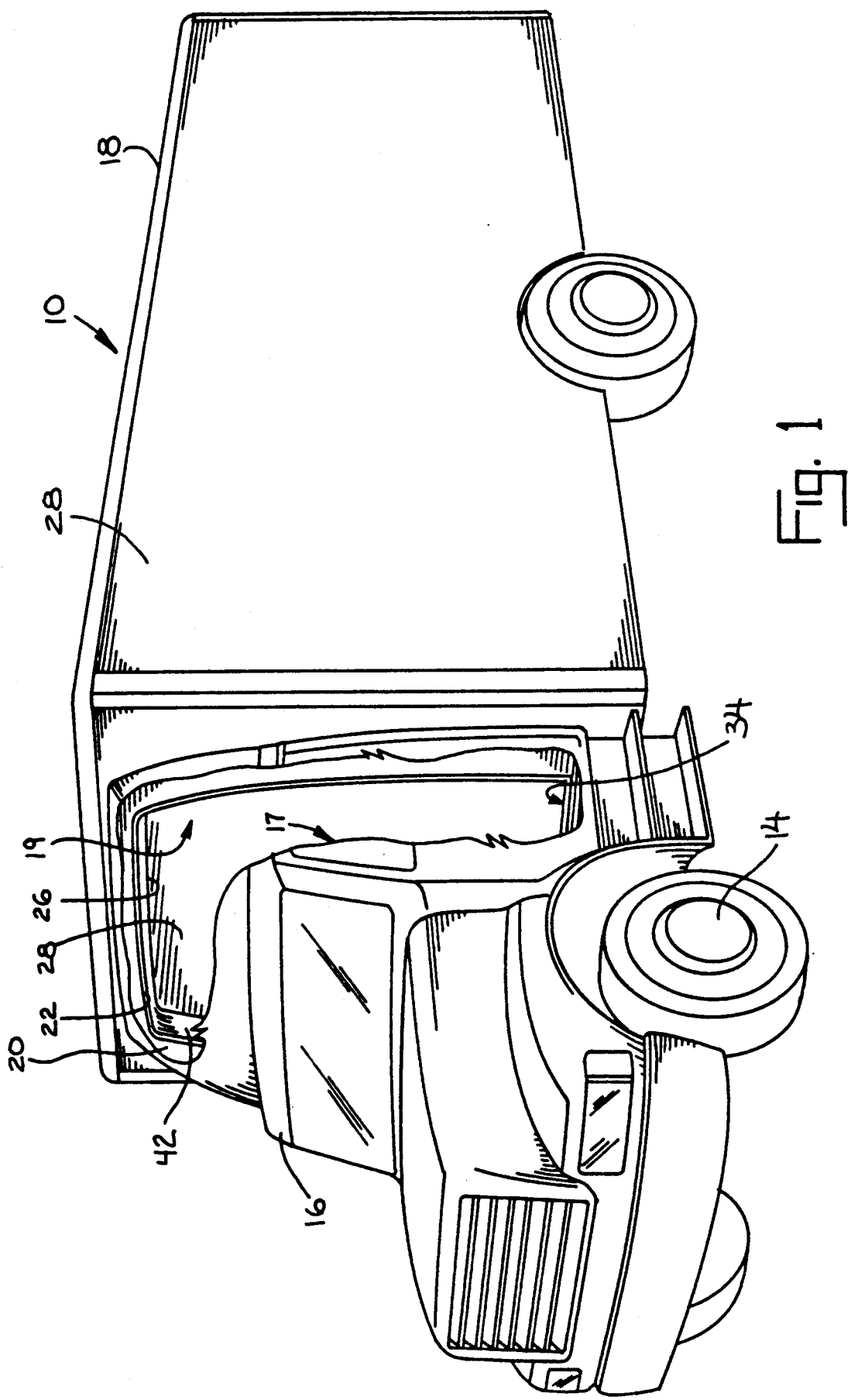
FIG. 1 is a perspective view of the cargo truck of this invention with portions cut away for illustrative purposes.
Figure 2:
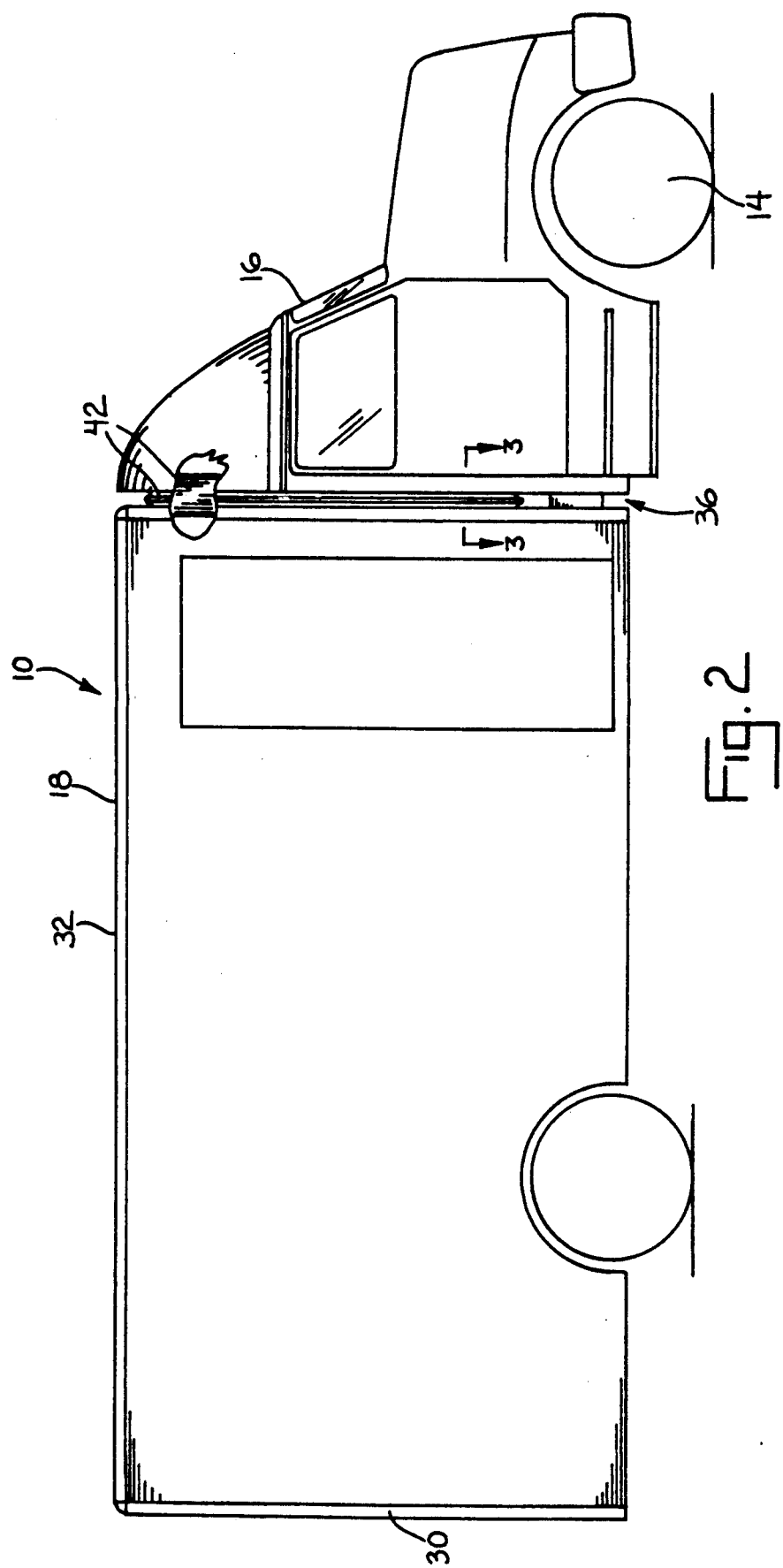
FIG. 2 is a side elevation view of the truck.

The preferred embodiment herein described is not intended to be exhaustive or to limit the invention to the precise form disclosed. It is chosen and described to explain the principles of the invention and its application and practical use to enable others skilled in the art to utilize its teachings.

Referring now to the drawings, reference numeral 10 refers generally to the cargo truck of this invention. Truck 10, as is common in the industry, includes a conventional frame chassis which carries wheels 14 and supports a cab 16 and a body 18. Cab 16 defines a passenger compartment 17 for seating a driver and one or more passengers, while body 18 defines a storage compartment 19 which is generally used to store cargo.

Cab 16 includes a rear wall 20 which has an opening 22 therethrough. Body 18 includes front wall 24 which has an opening 26 therethrough aligned with opening 22 to allow the cab passengers to walk from cab 16 into compartment 19 without exiting truck 10. Body 18 also includes side walls 28, rear wall 30, top wall 32 and floor 34 which together define compartment 19.

Cab rear wall 20 and body front wall 24 are spaced from one another as shown in FIG. 3 to define gap 36. A boot 38, preferably formed from flexible material such as rubber or the like, spans gap 36 as shown, and is secured to at least one of cab rear wall 20 and body front wall 24 by fasteners 40. A cover 42 of fabric or similar material is laid over boot 38 and secured to walls 20, 24 as by fasteners 46. A metal mounting plate 48 may be used to facilitate mounting of cover 42 to cab wall 20 as shown in FIG. 3.

So secured, boot 38 provides a force absorber for vibrational forces transmitted through cab 16 during road travel and also seals gap 36 and compartments 17, 19 against moisture ingress. Epoxy or similar sealant material 50 may be used to further secure boot 38 to walls 20, 24 and to provide additional weather sealing properties.

It is understood that the above description does not limit the invention to the given details but may be modified within the scope of the following claims.

I claim:

1. A truck for hauling cargo, said truck comprising a frame, a cab defining a passenger compartment mounted on said frame, and a body defining a cargo compartment mounted on said frame and having a front wall spaced from a rear wall of said cab, said cab rear wall and body front wall having aligned openings therethrough to define a passage to permit travel between the cab and the body, and a flexible boot connected between said cab rear wall and said body front wall, said boot spanning a gap between the cab rear wall and body front wall and constituting means for absorbing vibrational forces generated by said cab during road travel and an interior cover sheet overlying said boot, fastener means for securing said cover and boot to said body front wall and cab rear wall.

2. The truck of claim 1 wherein said boot is formed of rubber and the cover sheet is formed of fabric.

3. The truck of claim 1 and means for sealing said boot to said cab rear wall and body front wall to prevent moisture ingress into an interior of said truck.

4. The truck of claim 1 wherein said fastener means includes a mounting plate positioned between said boot and said cover sheet, at said cab rear wall, a fastener extending through said cover sheet, said mounting late, said boot, and into said cab rear wall.

* * * * *